INVENTORS
RAYMOND E. TIBBETTS
JANUSZ S. WILCZYNSKI
BY Edward G. Fiorito
ATTORNEY

| LENS | RADII | THICKNESS OR SEPARATION | $N_D$ | V |
|---|---|---|---|---|
| I | $R_1 = -.1545F$ | $t_1 = .0840F$ | 1.62031 | 60.29 |
|  | $R_2 = -.1966F$ | $S_1 = .00483F$ |  |  |
| II | $R_3 = -12.070F$ | $t_2 = .0406F$ | 1.62031 | 60.29 |
|  | $R_4 = -.5019F$ | $S_2 = .1024F$ |  |  |
| III | $R_5 = +.9656F$ | $t_3 = .0724F$ | 1.53988 | 59.66 |
|  | $R_6 = -.2427F$ |  |  |  |
| IV |  | $t_4 = .0241F$ | 1.61992 | 36.34 |
|  | $R_7 = +1.1744F$ |  |  |  |

United States Patent Office 3,433,558
Patented Mar. 18, 1969

3,433,558
LENS GROUP EMPLOYED IN LASER CAVITIES
Raymond E. Tibbetts, Mahopac, and Janusz S. Wilczynski, Ossining, N.Y., assignors to International Business Machines Corporation, Armonk, N.Y., a corporation of New York
Filed Dec. 6, 1965, Ser. No. 511,775
U.S. Cl. 350—225
Int. Cl. G02b 9/12
1 Claim

ABSTRACT OF THE DISCLOSURE

A four element lens group suitable for use in laser cavities. The lens group consists of a first meniscus lens, a second meniscus lens, a double convex lens and a double concave lens. An application of the lens group is the positioning of a pair of such groups in an angularly degenerate laser cavity to convert the angularly degenerate modes of oscillation into parallel modes of oscillation.

---

It has been found that laser cavities having a high degree of angular degeneracy are useful for controlling the direction of emission of laser beams. Examples of such laser cavities are shown in commonly assigned copending application Ser. No. 412,814, filed Nov. 20, 1964, entitled Apparatus for Controlling a Laser Beam by R. V. Pole and R. A. Meyers, and in commonly assigned concurrently filed application Ser. No. 511,841 filed Dec. 6, 1965 entitled Laser Scanning Device by R. V. Pole. Each of these applications show lenses which convert the angular modes of oscillation within the cavity into parallel modes of oscillation. This conversion permits simpler optical devices to be employed for setting up preferred modes of oscillation within the cavity.

The present invention is directed to an improved lens group capable of converting angular modes of oscillation into parallel modes of oscillation which converge in a flat field.

It is an object of the present invention to provide an improved lens group suitable for use in angularly degenerated laser cavities.

It is a further object of the present invention to provide a lens group capable of converting angularly degenerate modes of oscillation within a laser cavity into parallel modes of oscillation.

Still another object of the present invention is to provide a lens group capable of converging angular modes of oscillation within a laser cavity into focus in a flat field corrected for spherical aberration and astigmatism.

These and other objects of the present invention are accomplished by providing a lens group comprising four elements. The first lens, a negative meniscus lens is separated from the second lens, a faint meniscus lens, by a small separation. The third lens, a double convex lens is cemented to a fourth lens, a double concave lens. The separation between the second lens and the third lens is relatively large. This relatively large separation permits the lens group to be optically corrected over a large enough field to achieve satisfactory operation in an angularly degenerated laser cavity.

The foregoing and other objects, features and advantages of the invention will be apparent from the following more particular description of a preferred embodiment of the invention, as illustrated in the accompanying drawings.

Figure 1:
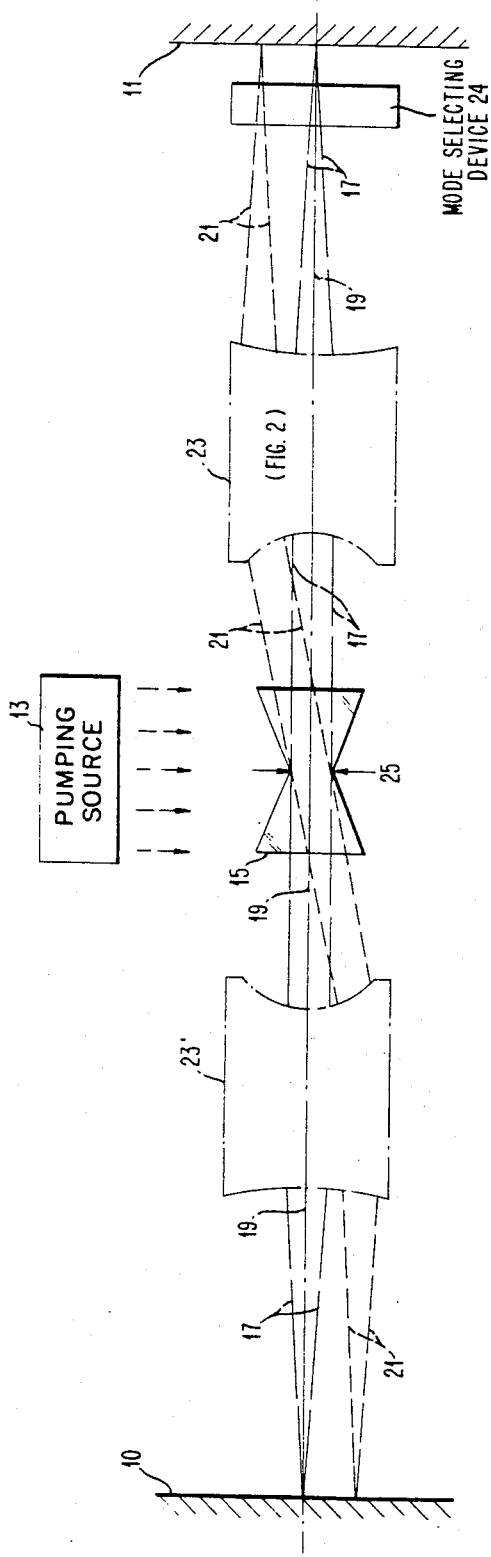
FIG. 1 is a sectional view of a laser cavity in which the present invention may be used.

The laser cavity shown in FIG. 1 illustrates the manner in which the present invention functions to convert angularly degenerate modes of oscillation into parallel modes of oscillation. The cavity is set up between a pair of plane mirrors 10 and 11. A pumping source 13 excites a ruby laser 15 into emission. The emission can take place along any number of different paths of oscillation. Two such paths are shown in FIG. 1. The first is illustrated by a bundle a rays 17 centered on an axis of symmetry 19 of the cavity. Another bundle of rays 21 shown in broken line illustrate a mode of oscillation which is angularly displaced from axis 19.

A pair of lens groups 23 and 23' convert all the angularly displaced modes of oscillation into parallel modes, and also cause the modes of oscillation to focus on the mirrors 10 and 11. As shown on FIG. 1, the rays 17 centered on axis 19 are converged by the lenses 23 and 23' into focus on mirrors 10 and 11. Since the mode represented by rays 17 is already parallel to the axis 19, no change in direction is produced by the lenses 23 and 23', except for convergence of the rays 17. The rays 21 are angularly displaced from the center line 19 between the lenses 23 and 23'. After passing through the lenses 23 and 23', the direction of the rays 21 is changed to a course generally parallel to the axis 19 and focused on the mirrors 10 and 11. In a similar manner, all modes of oscillation angularly displaced from the center line 19 are converted into parallel modes of oscillation before focusing on the mirrors 10 and 11.

The direction of emission is controlled by attenuating light along certain paths. A mode selecting device 24 is located adjacent to mirror 11 and may consist of a Kerr cell and Babinet compensator, or other optical devices shown in the above copending applications. Since the modes are parallel, the optical devices may be flat and simple in their construction.

In order to achieve satisfactory operation of the cavities, the lens groups 23 and 23' must be corrected for both spherical aberration and astigmatism over a sufficiently large field so that focusing exactly in the plane of mirrors 10 and 11 is accomplished. Without such correction, the resonance, or Q of the cavity is irregular for modes of oscillation having different regular displacements from the axis 19.

Figures 2, 3:
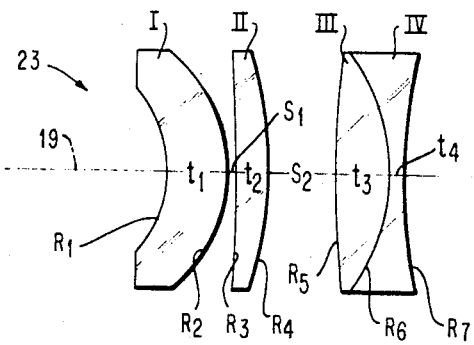
FIG. 2 is an optical diagram of a preferred form of the present invention.
FIG. 3 is a chart showing the constructional data for the lens group of FIG. 2.

FIG. 2 shows a preferred form of a lens group 23 employed in the cavity of FIG. 1. The same lenses may be used for group 23' by turning the group around. The lens group includes four elements where the lens closest to the laser 15 is a meniscus lens designated I. The next lens, a faint meniscus lens is designated II and is separated from lens I by a slight separation designated $S_1$.

The next lens is a double convex lens designated III which is cemented to a double concave lens designated IV. Lens II is separated from lens III by a relatively large distance, $S_2$. This separation $S_2$ permits the simultaneous correction of both spherical aberration and astigmatism. The necked down portion of laser 15 designated 25, acts as a diaphragm for lens 23 and 23'. Due to the remote location of the diaphragm 25, a closely packed group of lens elements not having the relatively large separation $S_2$ would be difficult or impossible to correct since the change in stigmatism would be in the same proportion to the change in spherical aberration for a common parameter change. It is highly improbable that both aberrations would reach their desired minima with the same common parameter change. By separating lenses I and II from lenses III and IV, changes in astigmatism resulting from an adjustment of parameters are non-proportional to changes in spherical aberration resulting from the same adjustment in parameters. Therefore, it is possible by proper selection of the shapes and thicknesses of the lenses to simultaneously correct for spherical aberration and astigmatism.

The following table of mathematical statement lists the range of constructional data related to the lens groups shown in FIG. 1:

$$.14F < -R_1 < .17F$$
$$.18F < -R_2 < .22F$$
$$10.0F < -R_3 < \infty$$
$$.47F < -R_4 < .53F$$
$$.85F < +R_5 < 1.15F$$
$$.22F < -R_6 < .26F$$
$$1.05F < +R_7 < 1.30F$$
$$.082F < t_1 < .086F$$
$$.004F < S_1 < .006F$$
$$.035F < t_2 < .045F$$
$$.100F < S_2 < .106F$$
$$.067F < t_3 < .077F$$
$$.019F < t_4 < .029F$$

wherein F stands for the equivalent focal length of the lens group I–IV, at 6943 angstroms $R_1$ through $R_7$ designate the successive lens surfaces beginning with the surface nearest to the laser 15, $t_1$ through $t_4$ designate the thickness of lenses I through IV respectively, $S_1$ designates the preparation between the lenses I and II, $S_2$ designates the separation between lenses II and III, the minus (−) sign applies to all lens surfaces which have their centers of curvature located on the side of the lens group nearest the laser 15, and the plus (+) sign applies to all lens surfaces which have their centers of curvature located to the right of this vertices.

One preferred form of the lens group shown in FIG. 1 is listed in the chart below wherein $R_1$ through $R_7$, $t_1$ (through $t_4$, $S_1$, $S_2$ and $N_{6943 A.}$ all have the same designations as given in the data above, and where $N_D$ and V represent respectively the refractive index and the Abbé number of the lens materials:

| Lens | Radii | Thickness or Separation | $N_D$ | V |
|---|---|---|---|---|
| I | $R_1 = -.1545F$ | $t_1 = .0840F$ | 1.62031 | 60.29 |
|  | $R_2 = -.1966F$ | $S_1 = .00483F$ |  |  |
| II | $R_3 = -12.070F$ | $t_2 = .0406F$ | 1.62031 | 60.29 |
|  | $R_4 = -.5019F$ | $S_2 = .1024F$ |  |  |
| III | $R_5 = +.9656F$ | $t_3 = .0724F$ | 1.53988 | 59.66 |
| IV | $R_6 = -.2427F$ | $t_4 = .0241F$ | 1.61992 | 36.34 |
|  | $R_7 = +1.1744F$ |  |  |  |

While the invention has been particularly shown and described with reference to a preferred embodiment thereof, it will be understood by those skilled in the art that various changes in form and details may be made therein without departing from the spirit and scope of the invention.

What is claimed is:
1. A lens group comprising:
   a meniscus lens designated I having a thickness $t_1$ and a pair of surfaces $R_1$ and $R_2$;
   a meniscus lens designated II having a thickness $t_2$ and a pair of surfaces $R_3$ and $R_4$, surface $R_3$ being located adjacent to said surface $R_2$ with a separation therebetween designated $S_1$;
   a double convex lens designated III having a thickness $t_3$ and a pair of surfaces $R_5$ and $R_6$, surface $R_5$ being located adjacent to said surface $R_4$ with a separation there between designated $S_2$;
   a double concave lens designated IV having one lens surface in mating contact with said surface $R_6$ and having a second surface designated $R_7$; where the following is a table of mathematical statements representing the range of values for the radii of said surfaces $R_1$ through $R_7$, said thickness $t_1$ through $t_4$, and said separations $S_1$ and $S_2$, and wherein F represents the equivalent focal length of the lens group at 6943 angstroms, the plus (+) and minus (−) signs designate lens surfaces which have their centers of curvature located to the left and right of this respective vertices, and $N_D$ and V represent the refractive index and Abbé number respectively of the lens materials:

| Lens | Radii | Thickness or Separation | $N_D$ | V |
|---|---|---|---|---|
| I | $R_1 = -.1545F$ | $t_1 = .0840F$ | 1.62031 | 60.29 |
|  | $R_2 = -.1966F$ | $S_1 = .00483F$ |  |  |
| II | $R_3 = -12.070F$ | $t_2 = .0406F$ | 1.62031 | 60.29 |
|  | $R_4 = -.5019F$ | $S_2 = .1024F$ |  |  |
| III | $R_5 = +.9656F$ | $t_3 = .0724F$ | 1.53988 | 59.66 |
| IV | $R_6 = -.2427F$ | $t_4 = .0241F$ | 1.61992 | 36.34 |
|  | $R_7 = +1.1744F$ |  |  |  |

References Cited

UNITED STATES PATENTS 2,158,507   5/1939   Konig _____ 350—228

DAVID SCHONBERG, Primary Examiner.

RONALD J. STERN, Assistant Examiner.